INVENTOR.
FORREST A. NELSON
BY
ATTORNEY

INVENTOR.
FORREST A. NELSON
BY
ATTORNEY

United States Patent Office 3,427,532
Patented Feb. 11, 1969

3,427,532
NUCLEAR MAGNETIC RESONANCE PROBE FOR SPECTROMETERS HAVING AN INTERNAL REFERENCE NUCLEI DIFFERENT THAN THE NUCLEI UNDER OBSERVATION
Forrest A. Nelson, Palo Alto, Calif., assignor to Varian Associates, Palo Alto, Calif., a corporation of California
Filed Feb. 14, 1966, Ser. No. 527,152
U.S. Cl. 324—.5
Int. Cl. G01r 33/08
9 Claims

ABSTRACT OF THE DISCLOSURE

A nuclear magnetic resonance spectrometer is disclosed. The spectrometer includes a probe structure for immersing a sample group of nuclei to be analyzed and a control group of nuclei of a different kind than the sample nuclei in a polarizing magnetic field. A first coil system of two coils is disposed within the probe. The first coil system includes a transmitter coil for applying a radio frequency resonance exciting magnetic field to the sample nuclei and a separate radio frequency receiver coil for detecting nuclear resonance of the sample group of nuclei. The probe also contains a second radio frequency coil system, separate from the first coil system, for exciting and detecting radio frequency magnetic resonance of the control group of nuclei to derive a spectrometer control signal. The sample group of nuclei and the control group of nuclei are both generally centrically disposed of both the first and second coil systems. In a preferred embodiment, the second coil system is concentrically disposed of the transmitter and receiver coils of the first coil system and is located intermediate the transmitter and receiver coils of the first coil system.

---

Figure 1:
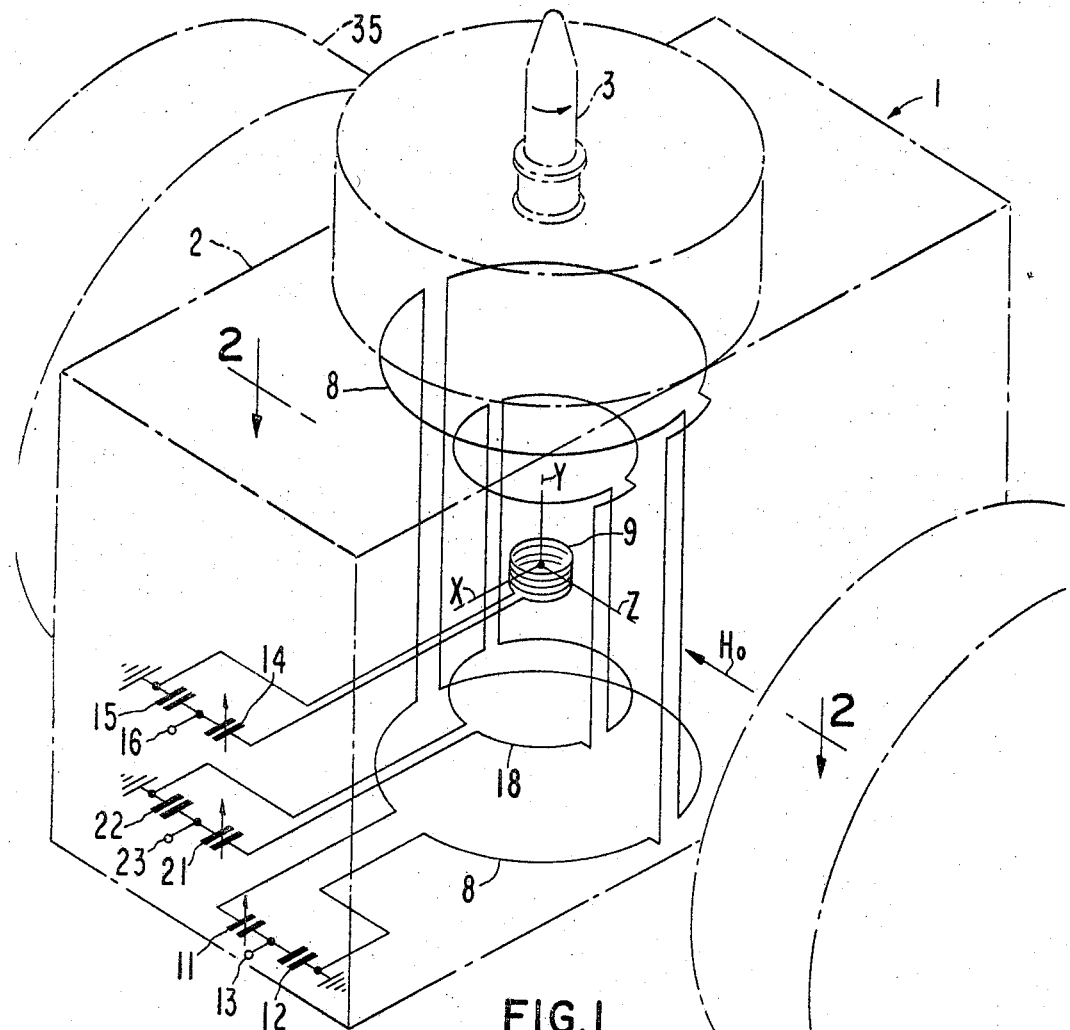

Heretofore, it has been proposed to observe the magnetic resonance of the protons of a sample under analysis at, for example, 60 MHz. while using an internal reference group of nuclei (intermixed with the sample or occupying nearly the same volume of magnetic field as obtained for example by use of a dual compartment concentric sample cell) for field-frequency control. Such reference nuclei could be, for example, the $F^{19}$ nuclei useful for field-frequency or homogeniety control at, for example, 56 MHz. Such a prior nuclear resonance spectrometer is described in U.S. Patent 3,085,195, titled, "Gyromagnetic Resonance Methods and Apparatus," issued Apr. 9, 1963, and assigned to the same assignee as the present invention. In this prior spectrometer the probe used only one coil system for exciting and detecting resonance of the two groups of nuclei at the two different frequencies. While this one coil system probe structure has the advantage of simplicity and ease of manufacture it is lacking in sensitivity for observing certain nuclei such as $N^{15}$ and $C^{13}$ which have much smaller relative sensitivities, i.e. weaker nuclear magnetic moments, as compared to $H^1$, combined with much lower relative natural abundance as compared to $H^1$. For example, $N^{15}$ has a relative sensitivity, compared to $H^1$, of $10^{-3}$ and a natural abundance, compared to $H^1$, of $3 \times 10^{-3}$. Thus the $N^{15}$ signal which is to be observed is expected to be only on the order of $3 \times 10^{-6}$ times the strength of the proton signal from a typical sample substance.

Thus it is desired, in certain nuclear resonance spectrometers, to employ two different systems of coils; one sensitive system such as a crossed coil system for exciting and detecting resonance of the sample under analysis; and a second coil system, which may have less sensitivity, for exciting and detecting the relatively strong resonance of the control or reference nuclei such as $F^{19}$ or $H^1$. However both coil systems must be built in such a way that they do not interfere with each other and at the same time couple to and excite resonance of both the reference and sample which essentially occupy the same volume of the magnetic polarizing field.

In the present invention the probe is constructed to house the two tuned coil systems, one of which is a sensitive crossed coil system and the other of which is a less sensitive single coil system for the field-frequency control channel. Also the reference or control channel may be used for automatic homogeniety control as described in a copending U.S. application Ser. No. 372,626, filed June 4, 1964, now abandoned in favor of CIP 681,057, filed Oct. 25, 1967, and assigned to the same assignee as the present invention.

In a preferred embodiment of the present invention, the sensitive crossed coil system is of conventional design having a split transmitter coil wound on a cylindrical coil form coaxially surrounding a cylindrical sample container with the axis of the split coils oriented at right angles to the axis of the coil form. The receiver coil of the sensitive system has a smaller diameter, is wound coaxially of the sample container, and is wound within the transmitter coil on a second cylindrical coil form. The less sensitive single coil control system is tuned for a higher frequency than the crossed coil system, is of the split coil type, is wound on a cylindrical coil form with its axis coaxial to the transmitter coil of the crossed coil set, and is disposed inbetween the coils of the crossed coil system. This particular coil set geometry has the advantage of substantially decoupling the less sensitive single coil control system from the crossed coil system while permitting use of a relatively large transmitter coil for the crossed coil system. The large transmitter coil permits substantial coupling of its fields to the sample volume while allowing its smaller receiver coil to couple to a smaller sample volume permeated by a substantially uniform radio frequency (R.F.) exciting field supplied by the transmitter coil. The result is a spectrometer having high sensitivity for $N^{15}$ or $C^{13}$ nuclei combined with the stability of a spectrometer using an internal control or reference nuclei.

The principal object of the present invention is the provision of an improved nuclear magnetic resonance spectrometer for observing or analyzing resonance of one kind of nuclei and controlling the stability of the spectrometer by means of an internal control group of a different kind of nuclei.

One feature of the present invention is the provision of an improved probe structure having a single coil system for stability control of the spectrometer by means of an internal reference nuclei and having a crossed coil system for observing resonance of a different kind of sample nuclei, whereby improved sensitivity and stability of the observed resonance spectrum is obtained.

Another feature of the present invention is the same as the preceding feature wherein the single coil control system is disposed inbetween the coils of the crossed coil system with the axis of the single coil parallel to the axis of transmitter coil of the crossed coil system whereby R.F. shielding of the sample volume from the crossed coil system is minimized.

Another feature of the present invention is the same as the first feature wherein the axis of the single coil system is oriented at right angles to the transmitter coil of the crossed coil system for R.F. decoupling the two systems.

Another feature of the present invention is the same as any one or more of the preceding features wherein the crossed coil system is tuned to the resonance frequency of $N^{15}$ or $C^{13}$ nuclei and the single coil control system is tuned to the resonance frequency of $H^1$ or $F^{19}$ nuclei.

Figure 2:
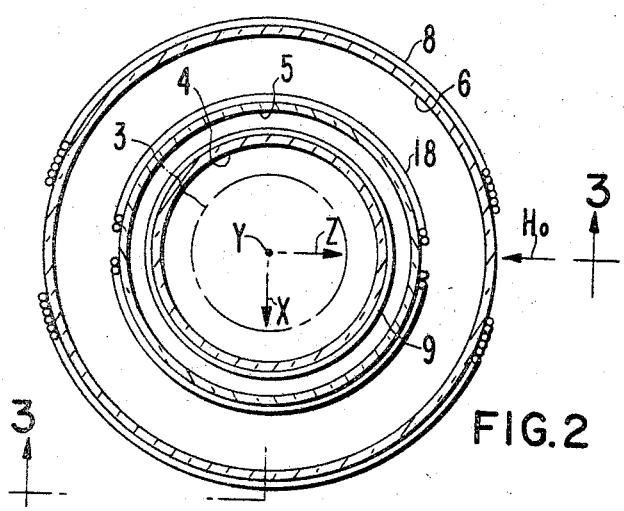
Figure 3:
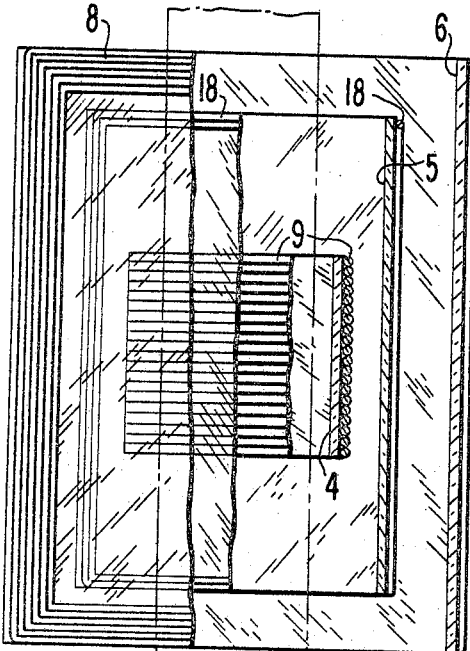
Figure 4:
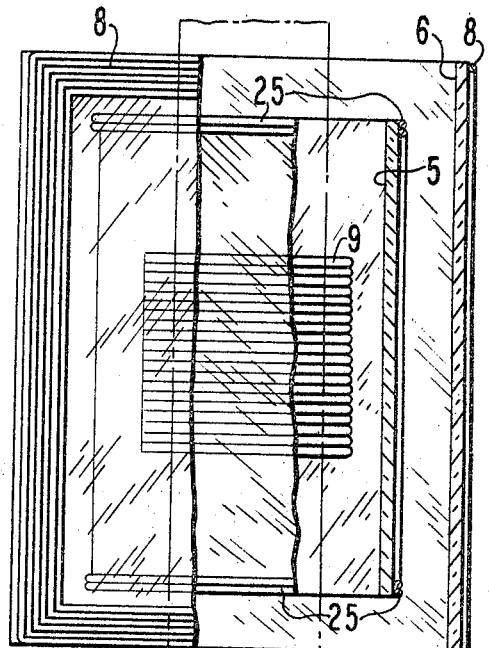
Figure 5:
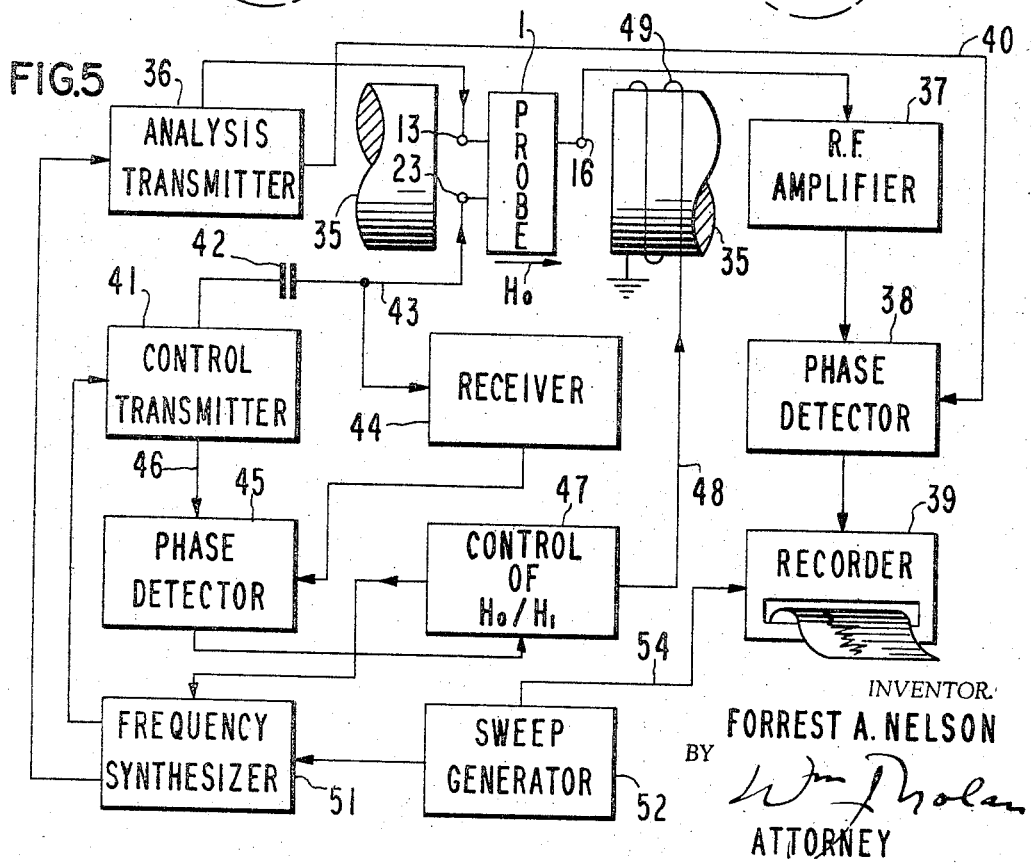

Other features and advantages of the present invention will become apparent upon a perusal of the following specification taken in connection with the accompanying drawings wherein:

FIG. 1 is a schematic perspective view showing the two separate coil systems of the present invention, FIG. 2 is a cross sectional view of the structure of FIG. 1 taken along lines 2—2 in the direction of the arrows, FIG. 3 is a view of FIG. 2 taken along line 3—3 in the direction of the arrows, FIG. 4 is a view similar to that of FIG. 3 showing an alternative embodiment of the present invention, and FIG. 5 is a schematic block diagram of a nuclear resonance spectrometer employing the probe features of the present invention.

Referring now to FIGS. 1–3 there is shown the coil system of the novel probe structure of the present invention. More specifically a conventional nuclear magnetic resonance spectrometer probe 1, as exemplified by that shown and described in U.S. Patent 3,091,732 issued May 28, 1964, but not shown in detail herein, is modified to receive two separate coil systems.

The probe 1 includes a rectangular metallic block body 2, as of aluminum, indicated by phantom lines 2. The probe body 2 is hollowed out to receive a hollow cylindrical sample container or vial 3 as of Pyrex. The vial 3 is coaxially inserted within a plurality of nested coaxial hollow cylindrical dielectric coil forms 4, 5 and 6 as of 1 mm. wall thickness Pyrex. An air turbine, not shown, is coupled to the vial 3 for spinning it about its longitudinal axis, as indicated by the arrow, at a high speed as of 3000 r.p.m. to average out certain magnetic field gradients over the sample volume.

A sample of matter to be investigated and containing nuclei of a first kind, as of for example $C^{13}$ or $N^{15}$, is inserted within the vial 3. Also a reference sample of matter containing nuclei of a second kind and preferably characterized by a relatively strong nuclear magnetic resonance line such as the portions ($H^1$) of tetramethylsilane or $F^{19}$ is provided internally of the vial 3, thus providing an internal reference. The reference sample provides a strong magnetic resonance line for controlling the magnetic resonance conditions, such as frequency, magnetic field or field homogeneity in the conventional manner as shown and described in U.S. Patent 3,085,195 and U.S. application Ser. No. 372,626, filed June 4, 1964, and assigned to the same assignee as the present invention.

The internal reference sample may be conveniently intermixed with the sample under analysis in some cases and in other cases the vial 3 may be partitioned into concentric compartments for separately containing the two samples of matter. As used herein, "internal reference" means that detected resonance of the reference group and of the sample group is obtained from common or nearly common regions of space, as for example, adjacent regions of space. In this manner both groups are subjected to the same resonance conditions of R.F. magnetic field and polarizing magnetic field such that the reference group actually senses and controls the actual resonance conditions over the sample under investigation.

The probe 1 contains a crossed coil system comprising a transmitter coil 8 for exciting resonance of the nuclei, as for example $C^{13}$ or $N^{15}$ of the sample under analysis, and a tuned receiver coil 9 for receiving the resonance signal. The transmitter coil 8 is of conventional geometry having a pair of rectangular coil segments series connected in magnetic field aiding relation. Each coil segment has, for example, 6 turns of insulated wire held to, and curving with, outside cylindrical surfaces of the coil form 6 via epoxy cement. For $N^{15}$ nuclei as 6 MHz., the transmitter coil 8 had a diameter of 22 mm. and a length of 28 mm. Each rectangular coil segment is coaxially aligned along the X axis for defining a coil axis at right angles to the direction of the polarizing magnetic field $H_0$, Z axis. The transmitter coil 8 is preferably tuned in the conventional manner via a variable tuning capacitor 11 connected across the leads of the series connected transmitter coil 8. The tuning capacitor 11 is conveniently one capacitor of a pair of voltage divider capacitors 11 and 12. The capacitance ratio of capacitors 11 and 12 is selected for impedance matching the transmitter coil 8 to the transmitter and its transmission line, not shown, but which are connected to the coil 8 via terminal 13 and ground for supplying R.F. power thereto at the magnetic resonance frequency of the nuclei under observation. The capacitors 11 and 12 may be located internally or externally of the probe 1.

The receiver coil 9 of the crossed coil system is of conventional form and comprises, for example, 10–20 turns of insulated wire wound coaxially upon and curving with the outside cylindrical surfaces of the inner coil form 4. In a typical example, the receiver coil 9 has a diameter of 12 mm. and a length of 12 mm. The receiver coil 9 defines an axis parallel to the Y axis and normal to both the direction of the polarizing magnetic field $H_0$ and the axis of the transmitter coil 8. As in the case of the preferred embodiment of the transmitter coil 8, the receiver coil 9 is tuned for resonance at the resonant frequency of the sample under analysis via a variable capacitor 14 of a pair of voltage dividing capacitors 14 and 15 connected at the terminals of the receiver coil 9. The capacitors 14 and 15 also serve as an impedance matching network for matching the impedance of the coil 9 to the input impedance of the spectrometer's receiver, not shown, which connects to the coil 9 via terminal 16 and ground.

A second coil system is also incorporated into the probe 1. The second coil system comprises a single coil 18 which is wound on the outside of and curves with the cylindrical surface of the intermediate nested coil form 5. This coil 18 forms the combined transmitter and receiver coil of a single coil magnetic resonance exciter and detector, not shown, for deriving a control signal for controlling one or more of the resonance conditions such as polarizing field intensity $H_0$, frequency of the resonance exciting A.C. magnetic field or homogeneity of the applied polarizing field. Single coil 18 is conveniently formed, in a preferred embodiment, by a pair of rectangular spaced coil segments series connected in magnetic field aiding relationship. The pair of coil segments are axially aligned and coaxially disposed of the transmitter coil 8. In a typical example of a single coil 18 each coil segment has two turns of insulated wire cemented to the coil form via epoxy cement and has a diameter of 15 mm. and a length of 15 mm. As in the other coils, a variable capacitor 21 is connected across the leads of the coil 18 for tuning it to the resonance frequency of the reference nuclei such as $F^{19}$ or $H^1$. The variable capacitor 21 forms one capacitor of a pair of capacitors 21 and 22, series connected, with the ratio of their capacitances selected for impedance matching the coil 18 to both a transmitter and receiver connected thereto via terminal 23 and ground.

Referring now to FIG. 4 there is shown an alternative embodiment of the single coil system of FIGS. 1–3. In this embodiment the probe 1 contains the same crossed coil system as described in FIGS. 1–3. However the single coil system is modified by providing a single coil 25 coaxially wound in two spaced segments on the outside of and curving with the surface of the intermediate cylindrical coil form 5. When the single reference sample coil 25 is wound in this manner it defines a coil axis normal to the polarizing field direction $H_0$ and coaxially with the axis of the receiver coil 9. As before, the spaced coil segments are series connected in magnetic field aiding relation and include capacitors 21 and 22 connected to the coil as shown in FIG. 1.

By positioning the receiver coil 9 within and axially coextensive with the central portion of the transmitter coil 8, the receiver coil 9 is coupled to that portion of the sample region of vial 3 which is permeated by the most uniform region of the applied exciting A.C. magnetic field. In addition, by positioning the receiver coil within and axially coextensive with the central portion of the single exciter and detector coil 18 or 25 of the control system or channel, the control system is coupled to essentially the same region of the composite sample as the analyzing channel of the spectrometer. Thus it is assured that the control channel actually controls the resonance conditions over the portion of the sample volume being analyzed and recorded. This assurance is especially important when the control channel is used for control of polarizing field homogeneity.

Referring now to FIG. 5 there is shown in block diagram form a spectrometer system employing the probe features of the present invention. More particularly the probe 1 is immersed in a polarizing magnetic field $H_0$ as of 14 kg. produced by a magnet 35. A first transmitter 36 is connected to the transmitter coil 8 of the crossed coil system via terminal 13 and supplies R.F. power to coil 8 within the probe at a frequency to excite nuclear magnetic resonance of the nuclei of the sample under analysis. For $N^{15}$ nuclei at a polarizing field intensity of 14 kg. the frequency of transmitter 36 is approximately 6 MHz. For $C^{13}$, the transmitter frequency is 15 MHz. at 14 kg.

The nuclear resonance signal of the nuclei under observation is received in receiver coil 9 and fed via terminal 16 to an R.F. amplifier 37 and thence to a phase detector 38 wherein the phase of the received signal is compared with the phase of the transmitted signal derived from transmitter 36 via lead 38 to obtain a D.C. output resonance signal. The output signal is fed to and recorded, as a function of time, sweep field or sweep frequency, in recorder 39 to produce a recorded spectrum of the sample under analysis.

The reference or control system includes a second transmitter 41 which supplies R.F. power, at the resonance frequency of the reference nuclei such as $H^1$ or $F^{19}$ to the single coil 18 via coupling capacitor 42, lead 43 and terminal 23. The applied signal for $H^1$ nuclei at 14 kg. polarizing field is about 60 MHz. and produces resonance of the $H^1$ nuclei forming the internal reference nuclei. Resonance of the nuclei appears as a signal emanating from the single coil 18 which signal is responsive in the input of the R.F. receiver 44 which is also connected to the single coil 18. The output signal of the receiver 44 is fed to a phase detector 45 where the received signal is compared to a signal derived from the control transmitter 41 via lead 46 to produce a phase sensitive D.C. dispersion mode resonance signal of the control group, i.e. resonance error signal. The error signal is fed to a controller 47, i.e. power amplifier, for controlling either/ or both the polarizing magnetic field intensity $H_0$ or the frequency of the applied R.F. exciting magnetic fields $H_1$ to maintain predetermined controlled values corresponding to sustained resonance of the reference or control group.

In case the polarizing field is being controlled the controller output signal is fed via lead 48 to a winding 49 on the magnet 35 or to the magnet power supply, not shown. In case the frequency of the applied R.F. magnetic fields $H_1$ is being controlled, the output control signal is fed to a frequency synthesizer 51 which serves as a common frequency source for both transmitters 36 and 41 to control both their frequencies in a like ratio.

A sweep generator 52 supplies a sweep signal to the frequency synthesizer 51 for sweeping only the frequency of the first transmitter 36 through a frequency range to cover the expected spectrum of the sample under analysis. An output proportional to the sweep is advantageously applied to the recorder 39 via lead 54 to obtain a recorded spectrum of the sample nuclei under analysis as a function of the sweep frequency.

Although the spectrometer system of FIG. 5 has been described using a frequency sweep obtained from the frequency synthesizer 51 to sweep through the spectrum of the sample under analysis, this is not a requirement. Other sweep methods are equally applicable. For instance, a variable frequency field modulation at a suitable sideband frequency as of 2 to 20 kHz. may be employed to advantage in certain spectrometer systems.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a nuclear magnetic resonance spectrometer, means forming a probe structure for immersing a sample group of nuclei to be analyzed and a control group of nuclei of a different kind than the sample nuclei in a polarizing magnetic field, means forming a first coil system disposed within said probe and having a transmitter coil means for applying a radio frequency resonance exciting magnetic field to the sample nuclei and a separate radio frequency receiver coil means for detecting nuclear resonance of the sample group of nuclei, the sample group of nuclei and the control group of nuclei being generally centrically disposed of both coils of said first coil system, means forming a second radio frequency coil system separate from said first coil system for both exciting and detecting radio frequency magnetic resonance of the control group of nuclei to derive a spectrometer control signal, and both the control and sample groups of nuclei being generally centrically disposed of said second coil system.

2. The apparatus of claim 1 wherein said second coil system is resonant and is disposed outside of said receiver coil means of said first coil system.

3. The apparatus of claim 1 wherein said second coil system is resonant and tuned to a higher frequency than said receiver coil means of said first coil system.

4. The apparatus according to claim 1 wherein said coils of said first and second coil systems define axes substantially transversely directed in the direction of the polarizing magnetic field.

5. The apparatus according to claim 1 wherein said receiver coil means of said first coil system is tuned to the nuclear resonant frequency of atoms selected from the class of $C^{13}$ and $N^{15}$, and wherein said second coil system is tuned to the nuclear resonant frequency of atoms selected from the class of $F^{19}$ and $H^1$.

6. The apparatus according to claim 1 wherein the axis defined by said second coil system is approximately at right angles to the axis of said receiver coil means of said first coil system.

7. The apparatus according to claim 1 wherein the coil axis defined by said second coil system is approximately coaxial of the coil axis defined by said receiver coil means of said first coil system.

8. The apparatus according to claim 1 wherein each of said coil means of said first and second coil systems are all wound on and curve with plural concentric cylindrical surfaces with the axial extent of said cylindrical surfaces defined by said coil means having an axially coextensive portion.

9. The apparatus according to claim 8 wherein said sample region for containing both kinds of different nuclei is located within said axially coextensive region of said coil systems of the probe.

References Cited

UNITED STATES PATENTS

| | | | |
|---|---|---|---|
| 3,085,195 | 4/1963 | Anderson | 324—0.5 |
| 3,109,138 | 10/1963 | Varian | 324—0.5 |
| 3,173,083 | 3/1965 | Anderson | 324—0.5 |
| 3,329,890 | 7/1967 | Kingston | 324—0.5 |

RUDOLPH V. ROLINEC, *Primary Examiner.*

M. J. LYNCH, *Assistant Examiner.*